United States Patent
Klassen (10) Patent No.: US 6,781,720 B1
(45) Date of Patent: Aug. 24, 2004

(54) GRADIENT-BASED TRAPPING USING PATTERNED TRAP ZONES

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/451,993

(22) Filed: Nov. 30, 1999

(51) Int. Cl.⁷ .............................................. G06F 13/00
(52) U.S. Cl. .................... 358/3.27; 358/1.9; 358/3.23; 358/3.26; 382/275
(58) Field of Search ........................... 358/1.1, 1.4, 1.9, 358/3.23, 3.26, 3.27; 382/173, 174, 176, 177, 178, 167, 199, 275; 354/597

(56) References Cited

U.S. PATENT DOCUMENTS

| | | | |
|---|---|---|---|
| 4,583,116 A | 4/1986 | Hennig et al. | |
| 4,700,399 A | 10/1987 | Yoshida | |
| 4,725,966 A | 2/1988 | Darby et al. | |
| 4,931,861 A | 6/1990 | Taniguchi | |
| 5,113,249 A | 5/1992 | Yosefi | |
| 5,131,058 A | 7/1992 | Ting et al. | |
| 5,204,918 A | 4/1993 | Hirosawa | |
| 5,241,396 A | 8/1993 | Harrington | |
| 5,295,236 A | 3/1994 | Bjorge et al. | |
| 5,313,570 A | 5/1994 | Dermer et al. | |
| 5,386,223 A | 1/1995 | Saitoh et al. | |
| 5,386,483 A | 1/1995 | Shibazaki | |
| 5,402,530 A | 3/1995 | Boenke et al. | |
| 5,410,414 A | 4/1995 | Curry | |
| 5,440,652 A | 8/1995 | Ting | |
| 5,513,300 A | 4/1996 | Shibazaki | |
| 5,542,052 A | 7/1996 | Deutsch et al. | |
| 5,613,046 A | 3/1997 | Dermer | |
| 5,615,314 A | 3/1997 | Schoenzeit et al. | |
| 5,638,110 A | 6/1997 | Curry et al. | |
| 5,666,543 A | 9/1997 | Gartland | |
| 5,668,931 A | 9/1997 | Dermer | |
| 5,696,604 A | 12/1997 | Curry | |
| 5,742,325 A | 4/1998 | Curry et al. | |
| 5,872,868 A | * 2/1999 | Curry | 382/266 |
| 5,923,821 A | * 7/1999 | Birnbaum et al. | 358/1.9 |
| 6,236,754 B1 | * 5/2001 | Harrington | 382/199 |
| 6,262,747 B1 | * 7/2001 | Rocheleau et al. | 345/620 |
| 6,456,394 B1 | 9/2002 | Gwaltney et al. | |
| 6,509,903 B1 | * 1/2003 | Yosefi | 345/597 |

FOREIGN PATENT DOCUMENTS

| | | |
|---|---|---|
| EP | 0484890 A2 | 11/1991 |
| EP | 0559393 A1 | 2/1993 |
| EP | 0718793 A2 | 6/1996 |
| EP | 0833216 A2 | 4/1998 |
| EP | 0929189 A2 | 7/1999 |

OTHER PUBLICATIONS

EP 00 12 5509, European Search Report, Dec. 15, 2003, Examiner Seytter, F., Munich.

* cited by examiner

Primary Examiner—Edward Coles
Assistant Examiner—Alan Rahimi
(74) Attorney, Agent, or Firm—Fay, Sharpe, Fagan, Minnich & McKee, LLP (57) ABSTRACT

A gradient-based trapping apparatus includes a processing device for receiving a current portion of a digital image. If the current portion includes an edge, a trapping device produces a trapped portion. The trapped portion represents the current portion with varying colors. The trapping device produces the trapped portion based on a plurality of patterns. Each of the patterns is chosen as a function of at least one of a) a distance of a current pixel within the current portion from the edge, b) at least one of a plurality of colors within the current portion, and c) a width of the trapped portion.

18 Claims, 7 Drawing Sheets

GRADIENT-BASED TRAPPING USING PATTERNED TRAP ZONES

BACKGROUND OF THE INVENTION

This invention relates to electronic processing of graphic images to produce multi-color prints using multiple separations. Typically, four (4) process color inks (i.e., cyan, magenta, yellow, and black) are used to print multiple separations, which tend to have minor misregistration problems. Trapping is a process for adjusting images to correct for misregistration. The present invention is directed to a process for controlling trapping, based on the appearance of any misregistration artifacts against the remainder of the image.

The layout of a page or graphic image depends upon combining "structured graphics" according to a pre-established graphic design. The structured graphics are contiguous regions of color, usually represented in a plurality of separation images, which in turn represent a succession of graphic objects imaged on the printing medium (e.g. the paper). The objects so imaged are shapes which can be isolated from each other, can abut one another at one or more points, can partially overlap one another, or can completely overlap one another. The resulting printed page or graphic image is therefore made up of a patchwork of shapes representing the graphic objects, some of which are "clipped" (or hidden) by objects imaged later in the succession.

The result of abutting or overlapping shapes is a boundary between adjacent regions of color which, under ideal printing conditions, should have zero (0) width. That is, the one color should stop exactly where the other begins, with no new colors introduced along the boundary by the printing process itself. The "colors" which fill the shapes can be solid colors, tints, degrades, contone images, or "no fill" (i.e., the paper with no ink applied). In general, the "colors" represented in these adjacent regions are printed using more than one colorant. In practice, therefore, the realization of a zero (0) width boundary between regions of different color is impossible as a result of small but visible misregistration problems from one printed separation to another. The error is manifested as a "light leak" or as a visible boundary region of an undesired color.

Figure 1A:
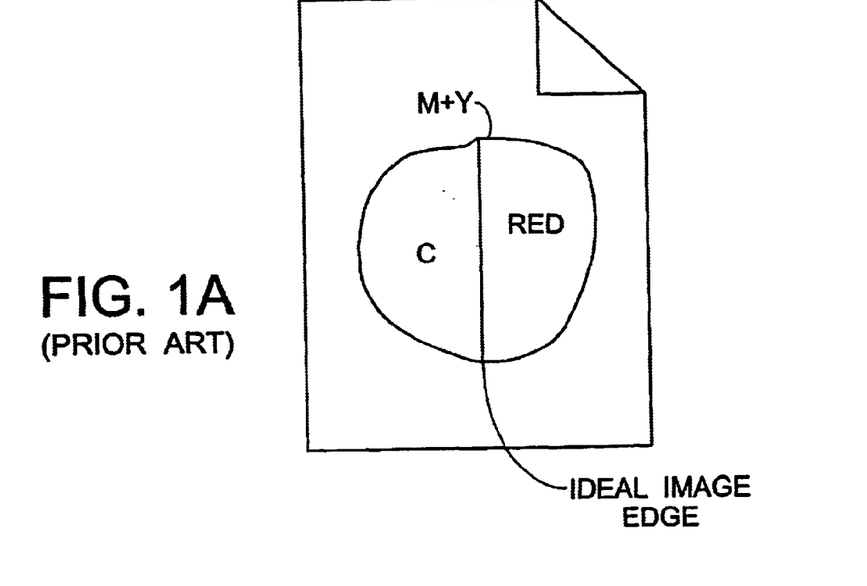
FIG. 1A illustrates an ideal boundary.
Figure 1B:
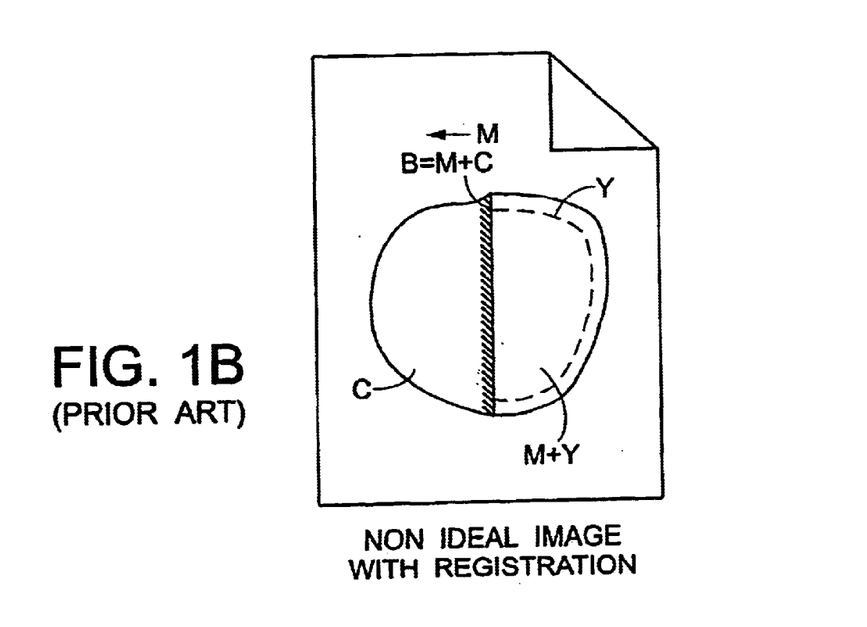
FIG. 1B illustrates a non-ideal boundary resulting from a slight misregistration.

As an example, FIG. 1A shows an ideal boundary between a red region on the right and a cyan region on the left, while FIG. 1B shows a non-ideal boundary, resulting from a slight misregistration of the magenta separation to the left on the page. Between the red and cyan regions is formed a blue line, from the unintended combination of cyan and magenta. On the right-hand side of the red region a yellow line is formed, again resulting from a slight misregistration of the magenta separation to the left on the page.

The problem of misregistration is a mechanical problem, almost always existing in printing systems. The problem arises because color separations are not laid exactly where intended, due to inherent imperfections in any separation registration process. It is somewhat correctable by mechanical registration methods; however it is rarely completely correctable. In expensive, high-end printing processes, customers have high expectations that misregistration artifacts will not be visible. In inexpensive, low-end printers, mechanical registration techniques are so expensive as to make correction or trapping essential.

As will become apparent, different printing technologies have distinct misregistration artifacts. Offset printing tends to have uniform misregistration in all directions. However, xerographic printing tends to have more misregistration in a single direction.

Methods for correcting such misregistration are known. The general approach is to expand one of the abutting regions' separations to fill the gap or misregistration border region with a color determined to minimize the visual effect when printed. Borders or edges expanded from a region of one color to another in this manner are said to be "spread." A border which has been expanded is referred to as a "trap," and the zone within which color is added is called the "trap zone."

Commonly used methods for automatic trapping of digital images fall into the categories of vector-based and raster-based methods. Vector-based methods rely on images that have been converted from a page-description language ("PDL") form, which describe objects as characters, polygonal shapes, etc., into an internal data structure. The internal data structure contains not only object information, but also a list of all the edges between regions of different color. Raster-based methods rely on images that have been first scanned or converted from page-description based form and are stored internally as a sequence of (high resolution) scan lines each containing individual scan elements or pixels. These methods process each raster line in sequence and compare one or more adjacent pixels to determine color boundaries. After some initial processing to find edges, both vector-based and raster-based methods apply rules for determining whether or not to create a trap at such boundaries, and finally apply a second set of rules to determine the nature of the trap if one is to be created.

Figure 2:
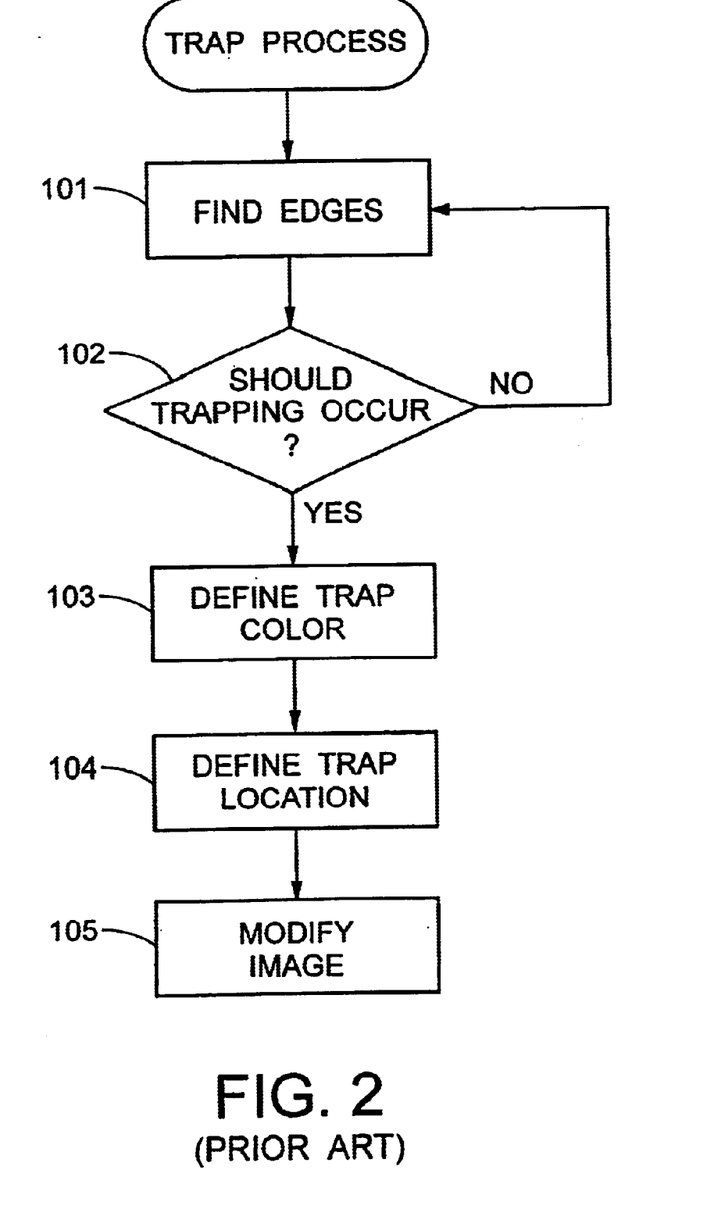
FIG. 2 illustrates a flowchart of conventional trapping processes.

Thus, it can be seen at FIG. 2 that most trapping processes take the following format, which shall be referenced throughout this discussion:

A. Find edges in the image, no matter how described (step 101);

B. For each pair of colors on each side of the found edge, determine:
  1) Whether trapping should be used (step 102);
  2) If so, what color should be used (step 103); and
  3) Where should that color be located or placed (step 104); and C. Modify the image accordingly (Step 105).

The present invention focuses on several elements of step C.

For example, the method of Taniguchi, described in U.S. Pat. No. 4,931,861, uses two rasterized images representing abutting or overlapping objects within an image field to define a third binary image, which represents the map of the pixels which make up the borders between the first and second images. These three (3) images are superimposed, pixel-by-pixel, to create a fourth and final binary image.

The method of Darby et al., described in U.S. Pat. No. 4,725,966, again defined on a pixel basis, uses a mask which is moved, one resolution element at a time, to evaluate the presence or absence of (pixel) colors upon which a positive or negative spread decision is based.

The method of Yosefi, described in U.S. Pat. No. 5,113,249, uses a set of automated rules as the basis for deciding, for each pair of abutting or overlapping shapes, whether or not to create a trap (an overlap region referred to as a "frame"), and, if so, the nature of the trap to create. The embodiment described by Yosefi makes use of scanned data, and processes each line of pixels in order. Each pixel is compared with three (3) pixels from the previous scan line and two (2) pixels from the same line to determine if a color change has occurred. The decisions regarding whether or not to create a trap, and the nature of such a trap if created, are imbedded within the processing sequence, making use of criteria established prior to the onset of processing. Yosefi describes rules to follow after finding an edge and knowing the two (2) colors. There are 24 rules based on whether the colors are tints, special colors (like gold leaf), black, yellow, "window" (meaning scanned image) and various combinations.

A commercially available product, "TrapWise", from Aldus Corporation, Seattle, Wash., also makes use of a raster approach to trapping. In this product, the processing time is proportional to the number of resolution elements, thereby increasing quadratically with resolution, and leading to greater computation times for high device resolution, e.g., 3,600 dots per inch (d.p.i.). Furthermore, traps are created with this package using pre-set rules, and are not editable by a user without the requirement for repeating the computation.

U.S. Pat. No. 4,583,116 to Hennig et al. describes a trapping process that evaluates the darkness on both sides of an edge in order to determine which object determines the contour. The object determining the contour is left unchanged. The other object is spread under it. The fill is constant, and matches the value of the separation being spread. The "darkest" separation is used to determine the contour and is kept constant. The lighter separations are all spread.

U.S. Pat. No. 4,700,399 describes a method that finds edges and uses a different undercolor removal ("UCR") along the edges from elsewhere to allow rich black without getting color bleeding along the edges of black objects. The method requires keeping colors away from edges of black text.

U.S. Pat. No. 4,931,861 to Taniguchi describes using binary operators to shrink or spread a shape where another shape is overlapped in another separation (thresholding is used to get these shapes). Also described is spreading where two (2) shapes are adjacent, and do not overlap.

U.S. Pat. No. 5,131,058 to Ting et al. converts a raster to an edge-based "outline" representation. Then the outlines are spread and the resulting image is re-rasterized. Spreading is done separation-wise with a process indicating whether there is a color difference that warrants spreading/choking.

U.S. Pat. No. 5,295,236 Bjorge, et al. is believed by the applicant to represent the Adobe or Aldus TrapWise product described above. This patent describes ways of deriving the information about edges required to trap, trapping with some simple rules, and converting the traps to vectors which are converted back to PDL form.

U.S. Pat. No. 5,204,918 to Hirosawa assumes vector data as input, describing the contours (i.e., no edge detection is performed). Image parts are selected in order of increasing priority. For parts of a contour of an image part where there is a lower priority image part adjacent, two supplemental contours are generated. These are offsets at a specified distance from the original contour. A new color is computed for the entire offset region (both sides of the original, not just where there is another object). The maximum density of the two (2) sides is used in the correction region. Minimum density might be used instead. The edge following required is either done in a frame buffer, or directly on vector data.

U.S. Pat. No. 5,402,530 to Boenke et al. uses a PDL input, and builds a data-structure using a modified Weiler algorithm to represent the contours. It is object-based, in that it considers four (4) classes of objects: interior fills; strokes on the borders of regions; text on top of regions; and text on its own.

U.S. Pat. No. 5,386,223 to Saitoh et al. addresses two-color printing, extending one (1) color into another where they abut. It suggests that it is desirable to extend the lighter color.

U.S. Pat. No. 5,542,052 to Deutsch, et al. claims a set of geometric rules. First, a relative darkness to each color is assigned, with key being the darkest color, cyan being a middle darkness color, and yellow being the lightest color. Then, the lighter color is spread under the darker color. A trap vector is drawn in a color which is a function of the two colors abutting each side of the edge.

U.S. Pat. No. 5,313,570 to Dermer, et al. takes either raster or PDL input, and creates an intermediate, vector-based form. The manipulations themselves are based on a plane sweep algorithm generating a display list and then from that display list generating a new representation called a scan beam table. The active edge table has a polygon stack for each edge. From these representations, a boundary map is generated.

U.S. Pat. No. 5,668,931 to Dermer describes trapping rules. The overall concept is to have a set of evaluation methods, and for each candidate trap, let each of the evaluation methods decide whether it is an optimum trap. Each method ranks all of the candidate traps, and then the traps are scored, using the weighted sum of the rankings. In this way, some evaluation methods are more influential than others. Candidate traps appear to consist of the typical spreads and chokes, although the disclosure suggests that reduced amounts are also possible. The evaluation methods are as follows: 1) For each possible misregistration, determine the minimum distance in CIELUV from the two bounding colors, and then use the maximum of those minima as a score; 2) Determine the CIELUV distance from the trap color to the color into which it is spread; 3) For each misregistration, determine the difference in L* values from each of the bounding colors, with the score set as the maximum value of the set (i.e., favoring relatively darker misregistration colors); 4) For each misregistration color, determining the absolute difference in L* value from each bounding color, so that the score is based only on lightness differences; 5) Determine the L* value of each misregistration color, with the score indicating dark misregistration colors; 6) Determine the L* of the bounding colors and assign a score equal to the absolute difference in L* when a dark color is spread into a light, or zero when a light color is spread into a dark, penalizing the former; and 7) Use the highest percentage of yellow in a misregistration color. The weights are determined empirically, and can be adjusted over time, or as a particular application demands. They are initially determined by a least squares process based on expert evaluation of a number of calibration traps.

U.S. Pat. No. 5,613,046 to Dermer describes a user interface allowing the display of an image, and selection of any color, pair, object, edge or color and modification of the trapping behavior in terms of inward/outward, or what color, how automatic or manual to be, etc. It also allows display of the effect of any of the 16 possible misregistrations on the selected color pair, object, edge or color, with or without the current trapping applied, and to iterate through the possible modifications, applying several possible traps to see which is best.

U.S. Pat. No. 5,440,652 to Ting describes a process to find an edge and track it, building a secondary edge during processing. The secondary edge will be used as the other side of the trap region. The placement of the secondary edge and the color of the region between is determined by reference to a rule base.

U.S. Pat. No. 5,615,314 to Schoenzeit et al. describes a basic architecture for a RIP—printer interface. It includes buffering and queues and compression for transferring page images to the printer from the RIP. It also has control information, in particular, multiple copy and abort instructions. It also provides an optional dilation processor which "selectively dilates objects" in order to compensate for potential misregistration errors. There is no indication of how it selects. It dilates using "standard convolution techniques" such as taking maximum of a 3×3 neighborhood.

U.S. Pat. No. 5,513,300 to Shibazaki describes trapping rasters against line art. They are concerned with the image and line art being at different resolutions. Line art is stored as run length data, and images as raster. The method forms a mask indicating where the image appears, and erodes or dilates the mask. The non-exempt separations of the image or line art are then copied into the eroded or dilated regions, respectively. A separation is exempt if the operator so indicates.

U.S. Pat. No. 5,386,483 to Shibazaki discusses finding a trapping region in a raster-based image. The image is segmented into regions, each of a constant color. Each such region is assigned a region number, and a lookup table is used to store the correspondence between region number, and colors, including both CMYK, and RGB. RGB is used by the operator supervising the process with a display and mouse. The data is then run-length encoded, using runs of color table indices. The algorithm is multi-pass. On the first pass, an eight-neighbor window is used to form a pair of "frame" regions along each color boundary. On subsequent passes, a four-neighbor set is used to extend the frame region. Finally, a color is assigned to each new region thus formed. To form a "frame" region, a three (3) scanline buffer is used. The center pixel in a window is considered to be in the frame region if 1) the pixel is located in one (1) of the original regions (i.e., not already in a frame region), and 2) at least one (1) neighbor is in a different region. Regions/colors have priorities specified (by the user). When the neighbor with the highest priority is part of a frame, the frame number is used for the new region of the pixel. Otherwise, a new frame number is allocated and used. It appears that priorities don't change when pixels are assigned to frame regions.

U.S. Pat. No. 5,241,396 to Harrington describes a simple raster-based technique for protecting rich black text. Black separation images are eroded and then ANDed with each of CMY separations, to produce new cyan, magenta and yellow separations. The original black is then used as the black separation.

U.S. Pat. No. 4,700,399 to Yoshida finds edges and uses a different UCR along the edges from elsewhere to allow rich black without getting color bleeding along the edges of black objects. Colors are kept away from edges of black text.

U.S. Pat. No. 5,666,543 to Gartland and U.S. Pat. No. 5,542,052 describes an arrangement providing a prolog substituted to turn on trapping. The prolog instructs the RIP to build a "shape directory" and then to trap the objects in the shape directory. The shape directory appears to be a back-to-front display list. Objects are processed in the back-to-front order. If they overlap existing objects, they are trapped against them. If the existing object already has been trapped, the traps are undone before the new traps are introduced. Thus, traps are introduced as objects are processed, possibly causing a region to be trapped and re-trapped as the traps are covered up. The decision of whether to trap includes text point size and changes in separation strength.

The trapping methods described in the above cited prior art references have two (2) common features. The first is that most process images represented in raster form. This feature places a requirement for extra processing steps in images which constitute primarily structured graphics or which combine structured graphics with contone images. Such images must first be rasterized at the output resolution, and then the appropriate line-scan algorithm applied. For raster based processing at high output device resolution, the potential number of pixel-to-pixel color transitions is large due to repetition of transitions corresponding to a single color region border shared by many scan lines.

The second common feature of prior art methods is the necessity to make and apply trapping decisions within the processing based upon pre-established criteria.

Many rule-based methods exist in the prior art for automatic determination of the particular trap to be specified for a given combination of bounding colors. For example, in U.S. Pat. No. 5,113,249, a set of logical tests is used in sequence to differentiate between pre-established generic color-pair categories, with a rule applied to each color pair. Such built-in rule systems attempt to replicate the human aesthetic judgment used in manual specification of traps and each can provide results satisfactory to an "expert" user in most cases while failing to do so in other special situations. Without a means for configuring the automatic trap selection method, a user is forced to rely on manual trap specification, even for routine operations.

The specification of a trap at the boundary between two (2) color regions does not in itself eliminate the misregistration of printing plates, but reduces the visual effect of misregistration within the trap zone through proper choice of the trap operation. In the event of plate misregistration involving a color separation for which a trap has been specified, additional "secondary" effects occur. The secondary effects should not cause the image to be worse than when untrapped.

Prior trapping methods describe using either luminance, which is a somewhat poorly defined term, or a different and more precise parameter called lightness in determining whether to trap. The methods described use luminance or lightness values directly by assessing the difference in luminance (in some cases) or lightness (in other cases) across an edge in order to decide whether to generate a trapping zone. Generally, these values are not used in more precise measures of human perception, however. As a result, the use of luminance or lightness contrast across an edge does not always provide an adequate indicator of whether a gap created by misregistration will be visible at the edge.

Yet another problem associated with trapping is where to put the trap color. Yosefi, above indicates that this is done by spreading the darker separations of the lighter color in the direction of the darker color. Much the same approach is indicated in the specifications of other patents that address the issue: make a trap region that consists of the dark separations of the light color and the remaining separations of the dark color, and put the trap region on the dark side of the edge. Lawler, "The Complete Book of Trapping" Hayden Books, 1995, pp. 21, 22, recommends spreading the lighter color into the darker color (at full strength), but when describing the determination of which color is lighter, suggests only that secondary colors are darker then the primaries they contain.

A. R. Robertson, "Historical development of CIE recommended color difference equations", *Color Research and Applications*, 15, (3), June 1990 describes the origins of CIE L*a*b* and CIE L*u*v* color spaces. (CIE, refers to the Commission Internationale de l'Eclairage, an international standards committee specializing in color). These two (2) spaces had the common goals of being simultaneously easy to compute, and perceptually uniform. Neither space is truly uniform throughout color space, but they have the merit of being readily computed. These two (2) standard color spaces were adopted in 1976. In both of these color spaces L* is a correlate of lightness, while the other two (2) coordinates give a way of specifying a color independent of its lightness. For example, in the L*a*b* system, larger values of a* indicate colors with more red in them while larger values of b* indicate colors with more yellow in them. Smaller values of a* indicate less red, or more green, while smaller values of b* indicate more blue (less yellow).

LAB color space, or CIELAB color space is based directly on CIE XYZ (1931) and represents an attempt to linearize the perceptibility of unit vector color differences. It is non-linear, and the conversions are reversible. Coloring information is relative to the color of the white point of the system, $(X_n, Y_n, Z_n)$. The non-linear relationships for L* a* and b* are intended to mimic the logarithmic response of the eye.

$L^* = 116((Y/Y_n)^{(1/3)}) - 16$ for $Y/Y_n > 0.008856$ $L^* = 903.3(Y/Y_n)$ for $Y/Y_n <= 0.008856$ $a^* = 500(f(X/X_n) - f(Y/Y_n))$ $b^* = 200(f(Y/Y_n) - f(Z/Z_n))$ where $f(t) = t^{(1/3)}$ for $t > 0.008856$ $f(t) = 7.787*t + 16/116$ for $t <= 0.008856$ Again, L* scales from 0 to 100.

To calculate the difference between two (2) colors in either CIE L*a*b* or L*u*v* space, one would normally use the Euclidean distance in the color space. For example, in L*a*b*, space one would calculate the difference between two (2) colors as $\Delta E_{ab} = (\Delta L^{*2} + \Delta a^{*2} + \Delta b^{*2})^{1/2}$. Here $\Delta L^*$ is the difference between the two (2) colors in the L* coordinate, etc.

The CIE color space specifications also include definitions of hue and chroma, so that for the L*a*b* space, they define $h_{ab} = \arctan(b^*/a^*)$ and $C_{ab}^* = (a^{*2} + b^{*2})^{1/2}$. In this form, $\Delta C$ is the difference between the two (2) chroma values, but $\Delta H_{ab} = (\Delta E_{ab}^2 - \Delta L^{*2} - C_{ab}^{*2})^{1/2}$.

Because of the lack of true uniformity in these color spaces, further refinements have followed. Of particular interest is the CIE94 color difference model (CIE Publication 116–1995: Industrial color-difference evaluation (Technical Report) CIE Central Bureau, Vienna 1995). In this formula, $\Delta E94 = ((\Delta L^{*2}/k_L S_L)^2 + (\Delta C_{ab^*}^2/k_C S_C)^2 + (\Delta H_{ab^*}^2/k_H S_H)^2)^{1/2}$, with specific functions weighting each of lightness, chroma and hue differences. For the reference viewing conditions, all of the k parameters are kept at 1. They are free to change with changes in the viewing geometry, etc. The "S" functions were specified as $S_L = 1$; $S_C = 1 + 0.045$ $C^*_{ab}$, and $S_H = 1 + 0.015$ $C^*_{ab}$. Thus, the larger the chroma (i.e., the more colorful the colors being discriminated), the larger a change in hue or chroma people need before they can see that two (2) colors are not the same. This color difference model provides a marked improvement over the Euclidean distance $\Delta E_{ab}$, but is only applicable for large regions obeying a specific geometry.

Due to the optics of the eye, the spacing of the receptors and the wiring of neural pathways leading to the brain, we can see fine detail best when it differs from the background in lightness. If there is no lightness variation, we can see detail better if it differs in redness (or greenness). Specifically, it is very hard to see fine detail in blue-yellow variation. Zhang and Wandell "A spatial extension of CIELAB for digital color image reproduction", SID 96 describes a method of finding the visual difference between two (2) images by first converting the images into an opponent color space, and then filtering the lightness channel, the red-green channel, and the blue-yellow channel each by different filters. The lightness is blurred least, and the blue-yellow channel the most, by these filters. In their paper, the resulting images are converted to CIEL*a*b* after blurring, and then the image difference is an image consisting of, at each pixel, $\Delta E_{ab}^*$, taken between corresponding pixels of the (filtered) two (2) original images. Zhang and Wandell name this metric S-CIELAB. An improvement over S-CIELAB is to use the CIE94 color difference metric in the place of $\Delta E_{ab}^*$, otherwise leaving S-CIELAB unchanged.

Note that one can compare any two (2) images. In particular, if one wishes to know whether a line induced by misregistration would be visible, one could compare an image with the line to one without the line. If the pixel with the largest error in the difference image has an error above some threshold, the line is visible.

The above patents and references and particularly U.S. Pat. No. 5,313,570 to Dermer, et al. and U.S. Pat. No. 5,668,931 to Dermer are hereby incorporated by reference for their teachings.

The present invention provides a new and improved method and apparatus for trapping digital images, which overcomes the above-referenced problems and others.

SUMMARY OF THE INVENTION

A method of gradient-based trapping a digital image receives a current portion of the digital image into a processing device. If the current portion includes an edge, a trapped portion is produced from the current portion. The trapped portion represents the current portion with varying colors.

In accordance with one aspect of the invention, the trapped portion is produced from a plurality of patterns. Each of the patterns is chosen as a function of at least one of a) a current distance from the edge, b) at least one of a plurality of colors defining the edge, and c) a width of the trapped portion.

In accordance with a more limited aspect of the invention, the patterns are chosen as a function of a printer used for producing the trapped portion. Furthermore, the trapped portion is printed using the printer.

In accordance with an even more limited aspect of the invention, an amount of a misregistration at the edge is identified. The patterns are chosen as a function of the amount of the misregistration.

In accordance with another aspect of the invention, the patterns are retrieved from a previously defined look-up table stored in a memory device.

In accordance with another aspect of the invention, a rasterized format of the current portion of the image is received into the processing device.

In accordance with another aspect of the invention, the trapped portion is produced to a size not greater than a size of a corresponding halftone spot.

One advantage of the present invention is that it provides a soft adjustment between edges, which may be more forgiving when the amount of trapping does not exactly match an amount of trapping needed by a system.

Another advantage of the present invention is that it provides a method and apparatus for digitally trapping images.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 3:
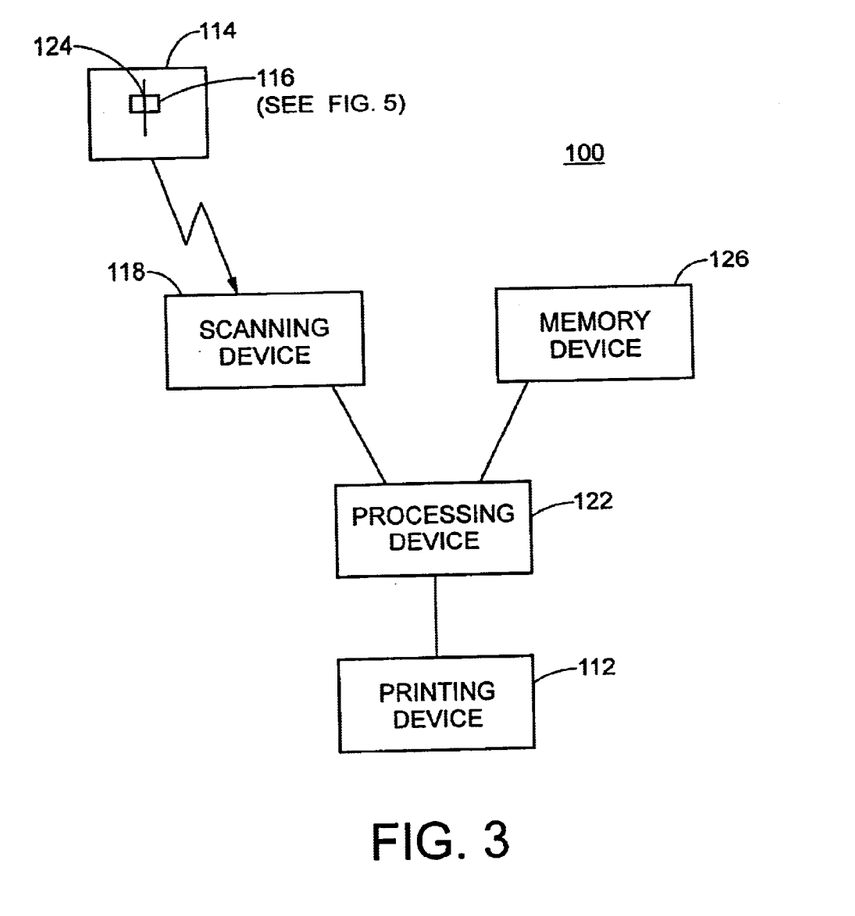
FIG. 3 illustrates a system for trapping an image according to the present invention.
Figure 4A:
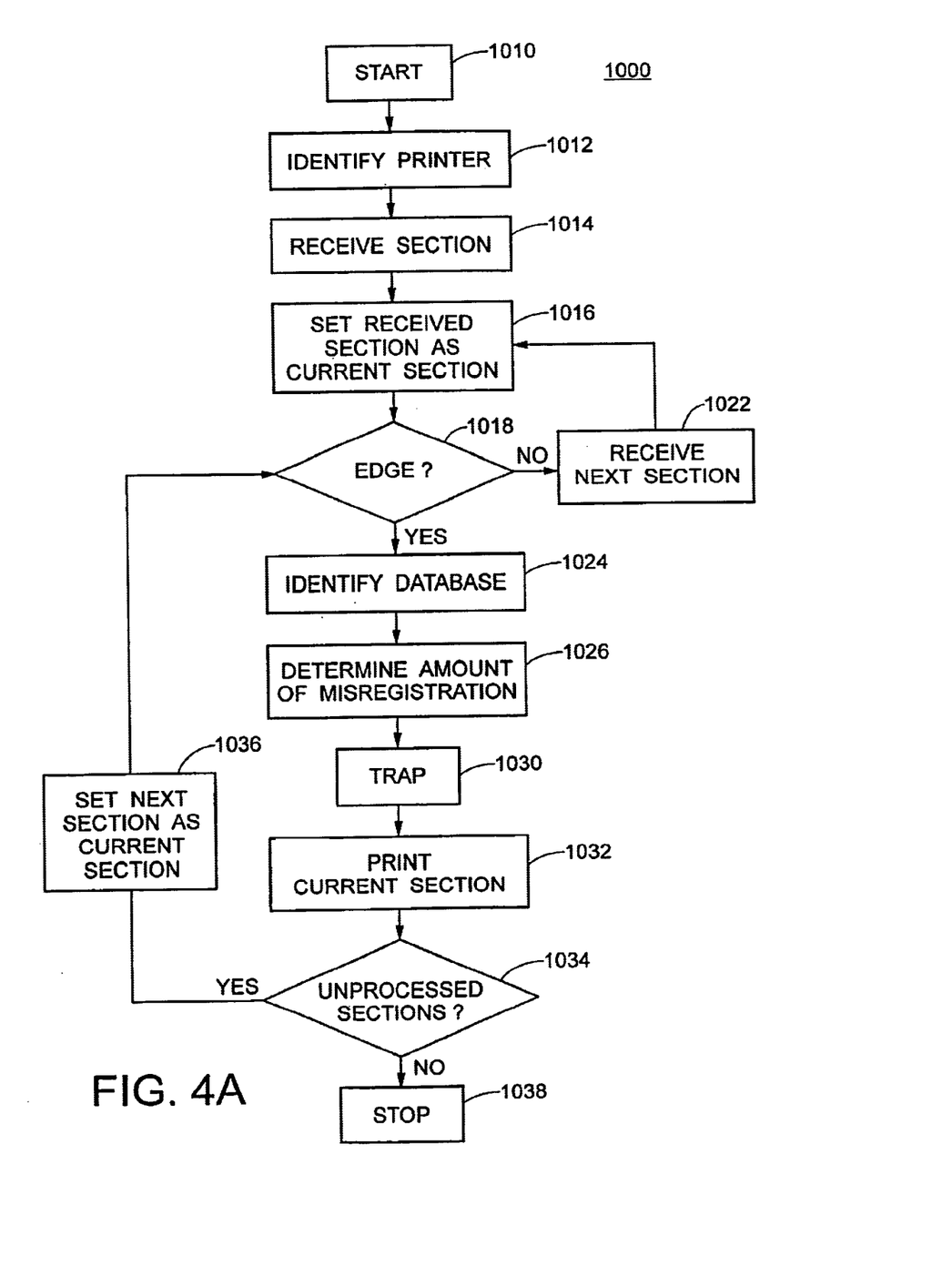
FIGS. 4A and 4B illustrate flowcharts for trapping an image according to the present invention.

With reference to FIGS. 3 and 4A, an image processing procedure 1000, which uses a system 110 for producing a trapped image, starts with a step 1010. A printing device 112, on which a processed version of an image 114 is to be printed, is identified in a step 1012. In the preferred embodiment, the printing device 112 is a color digital printer. However, other printing devices, including black & white digital printers, color facsimile machines, and black & white facsimile machines, are also contemplated.

A first section 116 of the image 114 is received, in a step 1014, from, for example, a scanning device 118 into a processing device 122. In the preferred embodiment, the image 114 is rasterized and received into the processing device 122 in a digital format. However, it is to be understood that other image formats are also contemplated. The first section 116 of the image 114 is set as a current section to be processed in a step 1016.

Once the current section 116 is received into the processing device 122, a determination is made, in a step 1018, as to whether an edge exists within the current section 116. It is to be understood that conventional means and methods are implemented, preferably within the processing device 122, for identifying the edge. If no edge is identified in the step 1018, a next section of the image 114 is received into the processor 122 in a step 1022. Control is then returned to the step 1016 for setting the next section as the current section.

Figure 5:
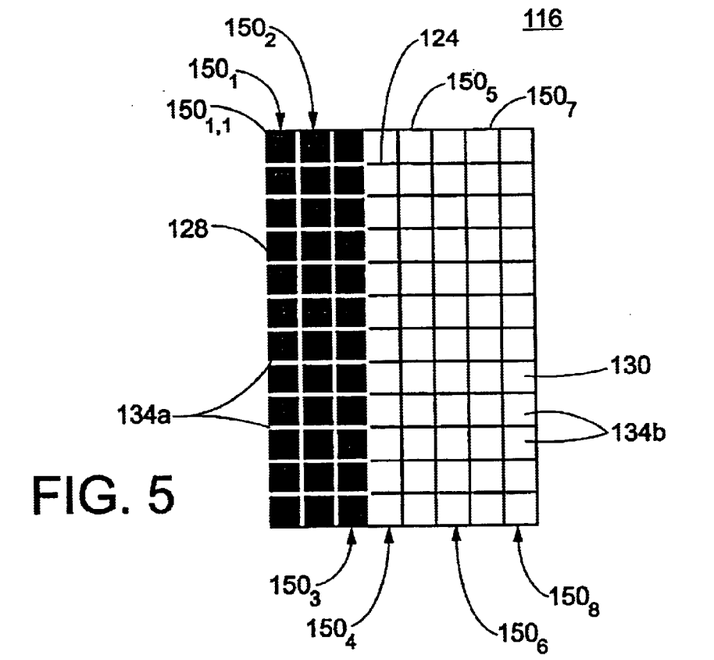
FIG. 5 illustrates a magnified view of a section in the image of FIG. 3.

An edge 124, such as the one shown in FIG. 5, identifies a transition between first and second areas 128, 130, respectively, of relatively constant colors. The edge 124 identifies, for example, a transition between cyan in the first area 128 and white in the second area 130. Furthermore, the colors of the first and second areas 128, 130 are identified by respective shades. More specifically, the first area 128 includes, for example, a 75% cyan color while the second area 130 includes a 100% white color.

The magnified view of the current section 116 illustrated in FIG. 5 shows a plurality of pixels 134. Each of the pixels 134 represents a halftone dot. It is to be understood that a plurality of the halftone dots (i.e., pixels) are used to create a halftone spot. The halftone dots are turned "on" and "off" according to conventional halftone techniques for achieving the desired shade and color of the respective halftone spots. In this manner, each of the halftone dots $134a$ (i.e., pixels) to the left of the edge 124 are a 75% cyan color while each of the halftone spots $134b$ to the right of the edge 124 are a 100% white color.

With reference to FIGS. 3–5, if an edge 124 is identified in the step 1018, a database (e.g., a "look-up table") used for trapping the current section 116 is identified, in a step 1024, as a function of the printing device 112 identified in the step 1012. The database is preferably stored in a memory device 126 that communicates with the processing device 122. Although the preferred embodiment shows the memory device 126 being distinct from the processing device 122, it is also contemplated that both the processing device 122 and the memory device 126 be included within a single unit.

An amount of misregistration at the edge 124 is determined in a step 1026. The amount of misregistration represents a gap between the two (2) colors along the edge 124 and is preferably measured in terms of pixels. Then, the current section 116 of the image 114 is trapped in a step 1030. After being trapped, the current section 116 of the image 114 is printed, in a step 1032, using the printing device 112. Alternatively, the current section 116 is stored in the memory device 126 to be printed at a later time.

Then, in a step 1034, the processing device 122 determines if any unprocessed sections remain in the image 114. If any sections of the image 114 have not yet been processed, one of the unprocessed sections is set as the current section in a step 1036. Then, control is returned to the step 1018 for determining if an edge exists in the current section. If, on the other hand, all sections of the image 114 have been processed, control is passed to a step 1038, which stops the image processing procedure.

The process of trapping sections of an image is described with reference to FIGS. 3, 4B, 5, and 6. The current section 116 is evaluated, in a step $1030a$, to determine the respective colors and shades of the first and second areas 128, 130. A current group of pixels $150_1$ (e.g., the pixels along the left edge of the current section 116) is evaluated in a step $1030b$ to determine a position relative to the edge 124, the colors, and the shades, of the pixels $150_1$ in the current group.

Figure 4B:
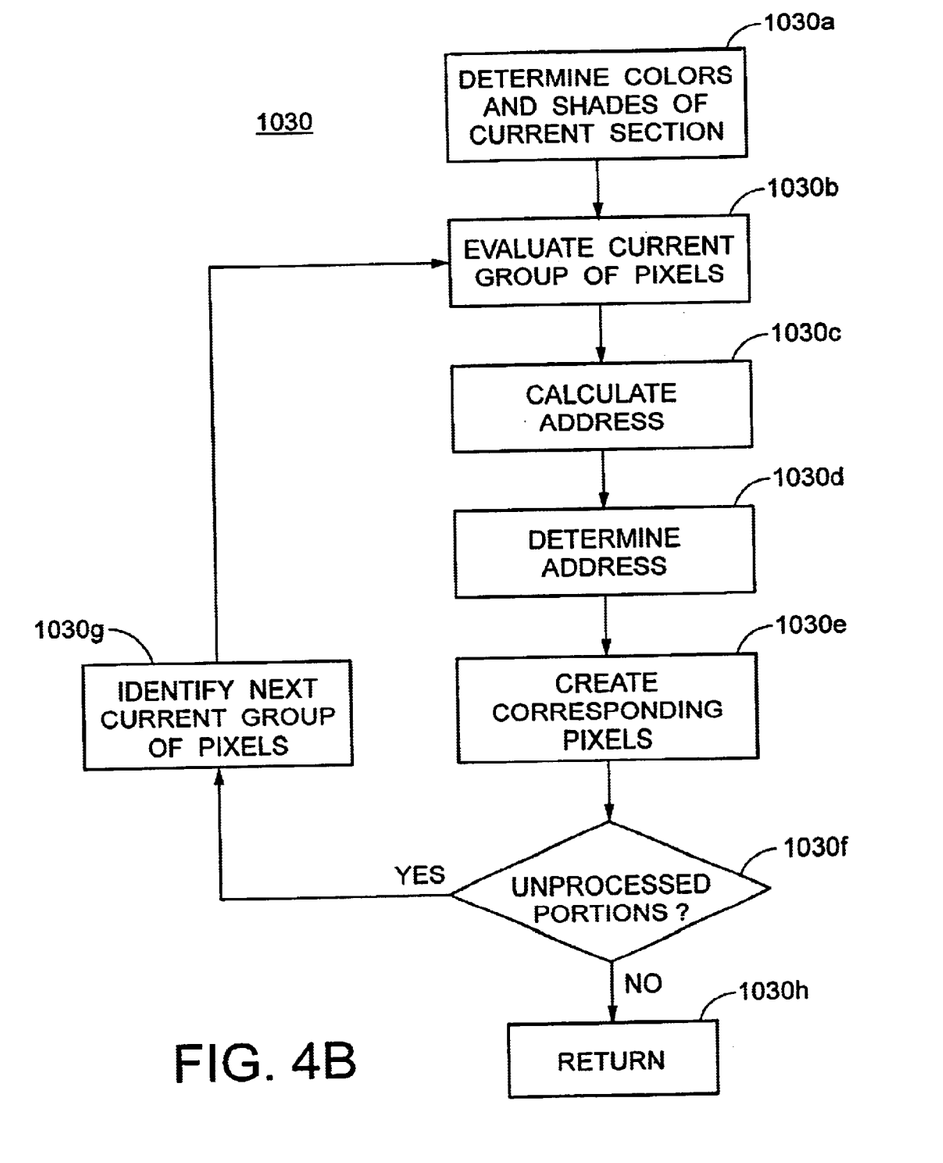

The group of pixels 150, are all 75% cyan and are located two (2) pixels away from the edge 124. An address within the look-up table stored in the memory device 126 is determined in a step $1030c$. As discussed above, the look-up table address is determined as a function of the colors of the pixels 134 within the current section 116, the colors of the pixels within the current group $150_1$, and the position of the current group of pixels $150_1$ relative to the edge 124, along with the amount of the misregistration. Once the address is calculated, data is read from the look-up table into the processing device 122, in a step $1030d$.

Preferably, the data includes a plurality of patterns for trapping images to be printed on the printing device 112, and is previously stored in the respective look-up table. One of the patterns is retrieved into the processing device 122 from a memory device 126 in the step 1030d. As discussed above, the patterns are defined and stored in the memory device 126 before the image is scanned. The patterns are created so that the pixels in a replacement section 200, which correspond to the current section 116, include colors and/or shades for ensuring a smooth, gradual transition at the edge after the current section 116 is trapped and halftoned. Furthermore, the patterns within a look-up table are created for a specific printing device. In other words, different look-up tables are used for different printing devices.

Figure 6:
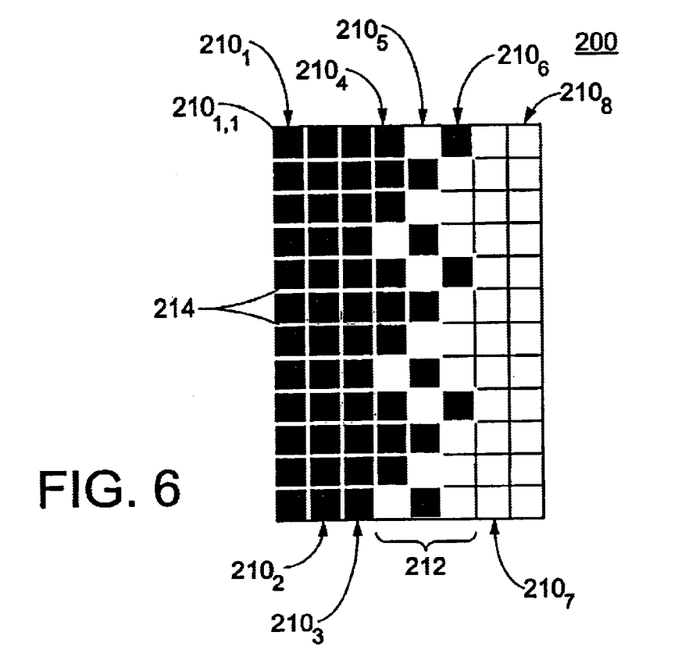
FIG. 6 illustrates a magnified view of the section shown in FIG. 5 after a trapping procedure according to the present invention is performed.

Each of the patterns identifies a model for creating a new group of pixels as a function of the current group of pixels. In the example discussed above, the current group of pixels $150_1$ is twelve (12) rows by one (1) column. Therefore, a new group of pixels $210_1$, which corresponds to the current group $150_1$, is also twelve (12) rows by one (1) column. Furthermore, each of the pixels within the respective groups $150_1$, $210_1$ has a one-to-one correspondence. For example, the pixel $150_{1,1}$ corresponds to the pixel $210_{1,1}$.

The various patterns in the database identify whether to create a corresponding pixel in the new group as having the color and shade of either the first or second area 128, 130, respectively. In the current example, the pattern retrieved in the step 1030d for the current group 150, indicates that all the corresponding pixels in the new group $210_1$ include the color and shade of the pixels to the left of the edge 124 (i.e., 75% cyan). The corresponding pixels in the new group $210_1$ are created according to the pattern in a step 1030e.

Once the corresponding pixels are created in the new group $210_1$, a determination is made in a step 1030f whether there are any unprocessed groups of pixels within the current section 116. If there are any unprocessed groups of pixels identified in the step 1030f, a next current group of pixels $150_2$ is identified within the current section 116 in a step 1030g. Then, control is passed to the step 1030b. If, on the other hand, no unprocessed groups of pixels are identified in the step 1030f, control passes to the step 1030h, which returns control to the step 1032 for printing the current section 116 of the image 114.

It is to be noted that the groups $150_1$, $150_2$, $150_3$, $150_4$, $150_5$, $150_6$, $150_7$, $150_8$ in the current section 16 correspond to the new group of pixels $210_1$, $210_2$, $210_3$, $210_4$, $210_5$, $210_6$, $210_7$, $210_8$, respectively, in the new section 200. The process described above is repeated for each of the groups of pixels 150 in the current section 116.

Each of the pixels in the new groups $210_1$, $210_2$, $210_3$ includes the color and shade of the pixels to the left of the edge 124 (i.e., 75% cyan) in the groups $150_1$, $150_2$, $150_3$, respectively. However, only three (3) of every four (4) pixels in the new group 2104 include the color and shade of the pixels to the left of the edge 124 (i.e., 75% cyan), while one (1) of each of the four (4) pixels in the new group $210_4$ includes the color and shade of the pixels to the right of the edge 124 (i.e., 100% white). Every one (1) of two (2) pixels in the new group 2105 include the color and shade of the pixels to the left of the edge 124 (i.e., 75% cyan), while the remaining pixels in the new group 2105 include the color and shade of the pixels to the right of the edge 124 (i.e., 100% white). Every three (3) of four (4) pixels in the new group $210_6$ include the color and shade of the pixels to the right of the edge 124 (i.e., 100% white), while only one (1) of every four (4) pixels in the new group $210_6$ include the color and shade of the pixels to the left of the edge 124 (i.e., 75% cyan). Each of the pixels in the new groups $210_7$, $210_8$ include the color and shade of the pixels to the right of the edge 124 (i.e., 100% white).

The new groups of pixels $210_4$, $210_5$, $210_6$ transition from three (3) of every four (4) pixels including the color (i.e., 75% cyan) on the left side of the edge 124 to one (1) of every four (4) pixels including the color on the left side of the edge 124 over a transition zone 212 of two (2) pixels. Therefore, the transition zone 212 over the pixels $210_4$, $210_5$, $210_6$ is said to represent a two (2) pixel spread. Such a two (2) pixel spread is typically used for correcting misregistrations having a gap of two (2) pixels. Similarly, patterns having a one (1) pixel spread, three (3) pixel spread, and four (4) pixel spread are preferably used for correcting misregistrations having a gap of one (1) pixel, three (3) pixels, and four (4) pixels, respectively.

The transition zone 212 represents a trapped portion of the new group of pixels $210_1$. Preferably, halftone spots, which are created from dots (pixels) 214 in the new section 200, are greater than or equal to the trapped portion 212. The transition zone 212 includes varying colors.

Figure 7A:
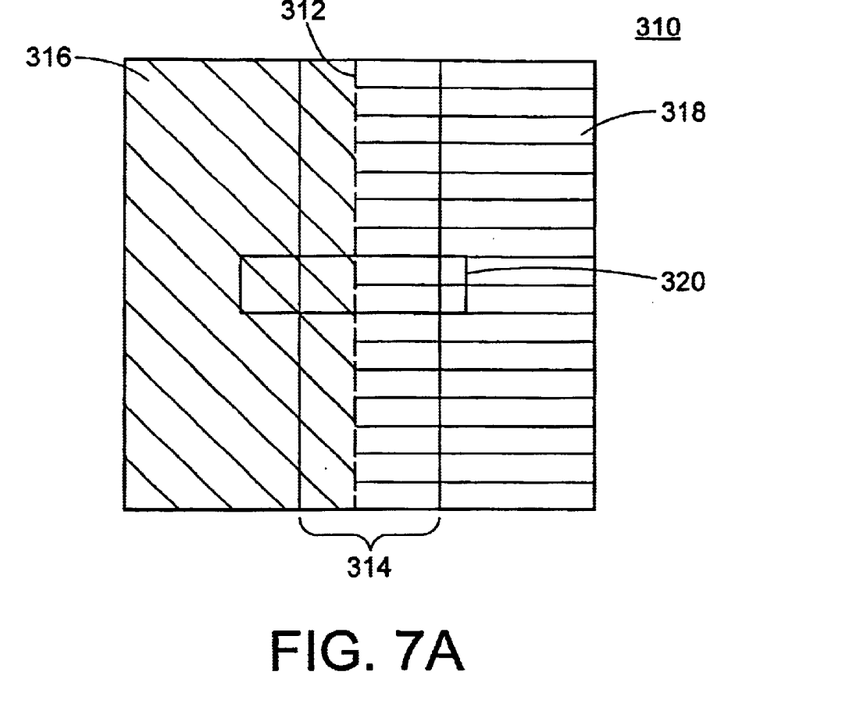
FIG. 7A illustrates a second unprocessed image.

With reference to FIG. 7A, an unprocessed image 310 includes an edge 312 within a trapping region 314. The edge 312 separates first and second regions 316, 318, respectively. Each of the regions 316, 318 includes respective colors and shades, which are represented by diagonal lines in the first region 316 and horizontal lines in the second region 318. A portion 320 extends across the edge 312 along with the first and second regions 316, 318, respectively.

Figure 7B:
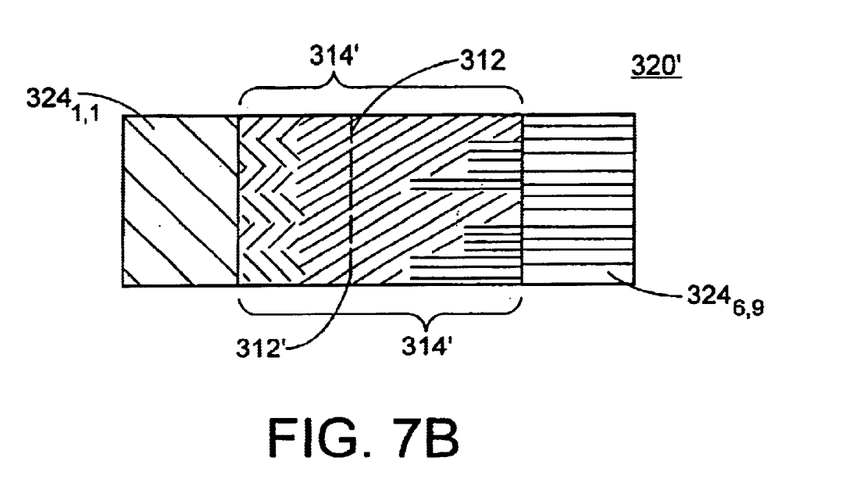
FIG. 7B illustrates a zoomed portion of the image shown in FIG. 7A after being processed according to a second embodiment of the present invention.

FIG. 7B illustrates a zoomed view of the portion 320' after being processed according to a second embodiment of the present invention. The zoomed view of the portion 320' includes six (6) rows and nine (9) columns of pixels 324. Only the top, left pixel $324_{1,1}$ and the bottom, right pixel $324_{6,9}$ are identified in FIG. 7B. However, it is to be understood that the positions of all the other pixels within the portion 320' may be identified as a function of the top, left and bottom, right pixels $324_{1,1}$, $324_{6,9}$, respectively. Furthermore, a subscript of "X" identifies all pixels within an identified row or column.

In the second embodiment, the pixels to the left and right of the trapping region 314' include the colors and shades of the first and second regions 316, 318, respectively (see FIG. 7A). More specifically, the pixels $324_{X,1}$ and $324_{X,2}$ all include the color and shade of the first region 316 (see FIG. 7A). Similarly, the pixels $324_{X,8}$ and $324_{X,9}$ all include the color and shade of the second region 318 (see FIG. 7B).

The pixels $324_{X,4}$ and $324_{X,5}$ immediately to the left and right, respectively, of the edge 312' include a trapping color. In this example, the trapping color includes one-half (½) the color and shade of the pixels to the left and one-half (½) the color and shade of the pixels to the right of the edge 312 (see FIG. 7A). However any color designed; to minimize the visibility of misregistration would be appropriate.

There are two (2) columns of pixels $324_{X,3}$, $324_{X,4}$ between the edge 312' and the left edge of the trapping region 314'. In order to allow for some variability in misregistration while minimizing the visibility of the trapping region, the colors in the two columns of pixels gradually change from the trap color (at the edge 312) to the color of first region 316 (at the boundary of the trap region 314'). Therefore, one-half (½) of the pixels $324_{X,3}$ (i.e., $324_{1,3}$, $324_{3,3}$, $324_{5,3}$) include the trapping color while the other half (½) of the pixels $324_{X,3}$ (i.e., $324_{2,3}$, $324_{4,3}$, $324_{6,3}$) include the color and shade of the pixels to the left of the edge 312 (see FIG. 7A).

There are three (3) columns of pixels $324_{X,5}$, $324_{X,6}$, $324_{X,7}$ between the edge 312' and the right edge of the trapping region 314'. In this example, one-third (⅓) of the pixels $324_{X,6}$ (i.e., $324_{3,6}$, $324_{6,6}$) include the color and shade of the pixels to the right of the edge 312 (see FIG. 7A) while the other two-thirds (⅔) of the pixels $324_{X,6}$ (i.e., $324_{1,6}$, $324_{2,6}$, $324_{4,6}$, $324_{5,6}$) include the trapping color. Furthermore, one-third (⅓) of the pixels $324_{X,7}$ (i.e., $324_{1,7}$, $324_{4,7}$) include the trapping color while the other two-thirds of the pixels $324_{X,7}$ (i.e., $324_{2,7}$, $324_{3,7}$, $324_{5,7}$, $324_{6,7}$) include the color and shade of the pixels to the right of the edge 312 (see FIG. 7A).

From the example of the second embodiment, which is illustrated in FIGS. 7A and 7B, it can be shown that the respective colors and shades of the pixels 324 within the processed portion 320' are a function of the colors and shades of the pixels in the first and second regions 316, 318, respectively, the width of the trapping region 314' and the distance of the pixel 324 from the edge 312'.

It is to be understood that the patterns of the pixels within the respective columns are retrieved from a look-up table like that described in the first embodiment. Furthermore, after being processed, the image is printed on a printing device such as the one described in FIG. 3. The number of pixels to take on each color in a given column would no doubt depend on the behavior of the specific model of printer, as well as the distance of that column from the edge, and the width of the trapping region.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of gradient-based trapping a digital image, comprising:

receiving a current portion of the digital image, which current portion includes pixels groups, into a processing device; and if the current portion includes an edge, trapping the current portion to produce a trapped portion which represents the current portion with varying colors by replacing the pixels groups by trapping patterns being selected from a plurality of predefined trapping patterns.

2. The method of gradient-based trapping a digital image as set forth in claim 1, wherein:

each of the trapping patterns being chosen for each group of pixels as a function of at least one of a) a current distance of each pixel group from the edge, b) at least one of a plurality of colors defining the edge, and c) a width of the trapped portion.

3. The method of gradient-based trapping a digital image as set forth in claim 2, further including:

choosing the trapping patterns as a function of a printer used for producing the trapped portion; and printing the trapped portion using the printer.

4. The method of gradient-based trapping a digital image as set forth in claim 3, further including:

identifying an amount of a misregistration at the edge; and choosing the trapping patterns as a function of the amount of the misregistration.

5. The method of gradient-based trapping a digital image as set forth in claim 2, further including:

retrieving the trapping patterns from a previously defined look-up table stored in a memory device.

6. The method of gradient-based trapping a digital image as set forth in claim 1, wherein the step of receiving includes:

receiving a rasterized format of the current portion of the image into the processing device.

7. The method of gradient-based trapping a digital image as set forth in claim 1, wherein the step of trapping includes:

producing the trapped portion to a size not greater than a size of a corresponding halftone spot.

8. A method of correcting for a misregistration in a digital image including:

a) receiving an original area of the digital image, which includes an edge, into a storage device, the misregistration existing along the edge;

b) producing a trapped region including a plurality of non-constant colors for representing the original area; and c) replacing pixels in the original area as a function of a plurality of models.

9. The method of correcting for a misregistration in a digital image as set forth in claim 8, further including:

d) choosing the respective models as a function of a position of current pixels in the original area, at least one color in the original area, and a width of the trapped region.

10. The method of correcting for a misregistration in a digital image as set forth in claim 9, further including:

e) retrieving the respective models from a storage device.

11. The method of correcting for a misregistration in a digital image as set forth in claim 9, wherein the choosing step includes:

e) determining a size of the misregistration; and f) choosing the respective models as a function of the size of the misregistration.

12. The method of correcting for a misregistration in a digital image as set forth in claim 11, further including:

g) choosing the respective models as a function of a printing device on which the trapped region is to be printed.

13. The method of correcting for a misregistration in a digital image as set forth in claim 12, further including:

h) repeating the steps a) through g) for subsequent original areas of the digital image.

14. A gradient-based trapping apparatus, comprising:

a processing device for receiving a current portion of a digital image; and a trapping device, if the current portion includes an edge, the trapping device producing a trapped portion for representing the current portion with varying colors, wherein the trapped portion is produced by selecting trapping patterns from a plurality of trapping patterns stored in a look-up table.

15. The gradient-based trapping apparatus as set forth in claim 14, wherein each of the trapping patterns being chosen as a function of at least one of a) a distance of a current pixel within the current portion from the edge, b) at least one of a plurality of colors within the current portion, and c) a width of the trapped portion.

16. The gradient-based trapping apparatus as set forth in claim 15, further including:

a printing device for producing the trapped portion, the trapping patterns being chosen as a function of the printing device.

17. The gradient-based trapping apparatus as set forth in claim 15, further including:

means for identifying an amount of a misregistration at the edge, the trapping patterns being chosen as a function of the amount of the misregistration.

18. The gradient-based trapping apparatus as set forth in claim 14, further including:

a memory device, the trapping patterns being previously defined and stored in the memory device, the processing device retrieving the trapping patterns from the memory device.

* * * * *